(12) United States Patent
Ostergaard et al.

(10) Patent No.: US 11,718,337 B2
(45) Date of Patent: Aug. 8, 2023

(54) HANDLE RELEASE AND LOCKING MECHANISM

(71) Applicant: Radio Flyer Inc., Chicago, IL (US)

(72) Inventors: Collin Ostergaard, Chicago, IL (US); Cameron Eckert, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 253 days.

(21) Appl. No.: 17/077,505

(22) Filed: Oct. 22, 2020

(65) Prior Publication Data

US 2021/0122403 A1    Apr. 29, 2021

Related U.S. Application Data

(60) Provisional application No. 62/925,010, filed on Oct. 23, 2019.

(51) Int. Cl.
*B62B 5/06* (2006.01)

(52) U.S. Cl.
CPC .............. *B62B 5/067* (2013.01); *B62B 5/064* (2013.01); *B62B 5/065* (2013.01)

(58) Field of Classification Search
CPC .......... B62B 5/067; B62B 5/064; B62B 5/065
See application file for complete search history.

(56) References Cited

U.S. PATENT DOCUMENTS

| | | |
|---|---|---|
| 1,371,198 A | 3/1921 | Conrad |
| 1,465,211 A | 8/1923 | Dunkelberger |
| 1,489,443 A | 4/1924 | Kelly |
| 1,771,813 A | 7/1930 | Norman |
| 1,820,466 A | 8/1931 | Lieblein |
| 2,020,766 A | 11/1935 | Brown |
| 2,471,553 A | 5/1949 | Zuckerman |
| 2,563,995 A | 8/1951 | East |
| 2,575,189 A | 11/1951 | Schmidt |

(Continued)

FOREIGN PATENT DOCUMENTS

| | | | |
|---|---|---|---|
| CN | 102166068 B | | 5/2013 |
| CN | 2423924 Y | * | 8/2017 |

(Continued)

OTHER PUBLICATIONS

International Search Report and Written Opinion issued to PCT/US20/56827, dated Jan. 21, 2021.

(Continued)

*Primary Examiner* — Victor D Batson
*Assistant Examiner* — Matthew J Sullivan
(74) *Attorney, Agent, or Firm* — Barnes & Thornburg LLP

(57) ABSTRACT

A handle release and locking mechanism for a wagon is provided. The mechanism has a pivotable drum, a handle secured to the drum, a release pedal, a main shaft about which the drum and release pedal pivot, and a locking pin. The release pedal moves from a locked position to an unlocked position by a user. The locking pin extends through the release pedal and the drum, and moves from a first position to a second position via movement of the release pedal. When the locking pin is in the first position the handle is locked in a generally vertical position. When the release pedal is moved to the unlocked position the locking pin is moved to the second position and the handle and pivotable drum can pivot about the main shaft.

20 Claims, 9 Drawing Sheets

(56) References Cited

U.S. PATENT DOCUMENTS

| | | |
|---|---|---|
| 2,942,679 A | 6/1960 | Gibson |
| 2,984,514 A | 5/1961 | Lemley |
| 2,989,318 A | 6/1961 | Schenkman |
| 3,116,935 A | 1/1964 | Mitchin et al. |
| 3,162,460 A | 12/1964 | Davidson |
| 3,893,532 A | 7/1975 | Perlowin |
| 4,227,709 A | 10/1980 | Gradwohl et al. |
| 4,449,322 A | 5/1984 | Blumenthal |
| 4,706,986 A | 11/1987 | Kassai |
| 4,735,426 A | 4/1988 | McConnell |
| 4,741,552 A | 5/1988 | Kassai |
| 4,746,140 A | 5/1988 | Kassai |
| 4,763,907 A | 8/1988 | Raymond |
| 4,796,909 A | 1/1989 | Kirkendall |
| 4,811,968 A | 3/1989 | Bolden |
| 4,824,137 A | 4/1989 | Bolden |
| 4,844,493 A | 7/1989 | Kramer |
| 4,856,810 A | 8/1989 | Smith |
| 4,878,682 A | 11/1989 | Lee |
| 4,887,836 A | 12/1989 | Simjian |
| 5,050,900 A | 9/1991 | Lee |
| 5,333,893 A | 8/1994 | Chen |
| 5,360,222 A | 11/1994 | Bro et al. |
| 5,423,592 A | 6/1995 | Spurrier et al. |
| 5,427,540 A * | 6/1995 | Taguchi ............ H01R 13/62933 439/157 |
| 5,538,267 A | 7/1996 | Pasin et al. |
| 5,641,296 A * | 6/1997 | Larabell ............ H01R 13/62933 |
| 5,657,828 A | 8/1997 | Nagamachi |
| 5,699,647 A | 12/1997 | Weder et al. |
| 5,746,282 A | 5/1998 | Fujiwara et al. |
| 5,806,864 A | 9/1998 | Zielinski et al. |
| 5,833,251 A | 11/1998 | Peck |
| 5,857,695 A | 1/1999 | Crowell |
| 5,876,049 A | 3/1999 | Spear et al. |
| 5,911,432 A | 6/1999 | Song |
| 5,915,723 A | 6/1999 | Austin |
| 5,947,493 A | 9/1999 | Pasin et al. |
| 5,957,482 A | 9/1999 | Shorter |
| 6,010,145 A | 1/2000 | Liu |
| 6,079,720 A | 6/2000 | Spear et al. |
| 6,079,777 A | 6/2000 | Simmons et al. |
| 6,142,491 A | 11/2000 | Darling, III |
| 6,164,671 A | 12/2000 | Darling, III |
| 6,182,988 B1 * | 2/2001 | Wu .................... B62K 3/002 280/87.041 |
| 6,220,611 B1 | 4/2001 | Shapiro |
| 6,270,092 B2 | 8/2001 | Darling, III |
| 6,276,471 B1 | 8/2001 | Kratzenberg et al. |
| 6,318,740 B1 | 11/2001 | Nappo |
| D458,648 S | 6/2002 | Chiappetta et al. |
| 6,488,293 B1 | 12/2002 | Mitchell et al. |
| 6,491,318 B1 | 12/2002 | Galt et al. |
| 6,499,750 B1 | 12/2002 | Michelau |
| 6,536,796 B2 | 3/2003 | Solomon |
| 6,561,529 B2 | 5/2003 | Darling, III |
| 6,581,945 B1 | 6/2003 | Shapiro |
| 6,629,574 B2 | 10/2003 | Turner |
| D483,419 S | 12/2003 | Chiappetta et al. |
| 6,663,139 B1 | 12/2003 | Smith |
| 6,733,026 B1 | 5/2004 | Robberson et al. |
| 6,845,991 B1 | 1/2005 | Ritucci et al. |
| 6,877,764 B2 * | 4/2005 | Sagol .................. B62B 5/06 280/655 |
| 6,893,030 B2 | 5/2005 | Shapiro |
| 6,916,028 B2 | 7/2005 | Shapiro |
| 6,932,365 B2 | 8/2005 | Chiappetta et al. |
| 7,017,939 B2 | 3/2006 | Darling, III |
| 7,066,485 B2 | 6/2006 | Shapiro |
| 7,097,182 B1 | 8/2006 | Liu |
| 7,118,115 B2 | 10/2006 | Abel |
| 7,150,339 B2 | 12/2006 | Liao et al. |
| 7,150,465 B2 | 12/2006 | Darling, III |
| 7,163,213 B2 | 1/2007 | Chambers |
| 7,210,545 B1 | 5/2007 | Waid |
| 7,226,059 B1 | 6/2007 | Samuels |
| D547,812 S | 7/2007 | Seckel et al. |
| 7,284,797 B2 | 10/2007 | Huang |
| D566,200 S | 4/2008 | Seckel et al. |
| D570,424 S | 6/2008 | Blair |
| D573,663 S | 7/2008 | Ogawa |
| 7,392,994 B2 | 7/2008 | Darling, III |
| 7,407,177 B2 | 8/2008 | Darling, III |
| 7,461,857 B2 | 12/2008 | Darling, III |
| 7,475,900 B2 | 1/2009 | Cheng |
| 7,487,977 B2 | 2/2009 | Johnson |
| 7,490,684 B2 | 2/2009 | Seymour et al. |
| 7,523,955 B2 | 4/2009 | Blair |
| 7,547,037 B2 | 6/2009 | Poppinga et al. |
| 7,562,897 B1 | 7/2009 | Sherman et al. |
| 7,584,985 B2 | 9/2009 | You et al. |
| 7,661,156 B2 | 2/2010 | Thorne et al. |
| 7,709,795 B2 | 5/2010 | Yamanaka et al. |
| 7,731,221 B2 | 6/2010 | Bess |
| 7,775,530 B2 | 8/2010 | Darling, III |
| 7,823,906 B2 | 11/2010 | Darling, III |
| 7,836,530 B2 | 11/2010 | Thorne et al. |
| 7,922,719 B2 * | 4/2011 | Ralph ................ A61B 17/1659 606/160 |
| 7,988,213 B2 * | 8/2011 | Muhlfelder ........... A47J 45/077 215/396 |
| 8,011,686 B2 | 9/2011 | Chen et al. |
| 8,060,959 B2 | 11/2011 | Thorne et al. |
| 8,070,182 B2 * | 12/2011 | Wang ................... B62J 7/04 280/655 |
| 8,091,916 B2 | 1/2012 | Shapiro |
| 8,120,190 B2 | 2/2012 | Bravo |
| 8,127,392 B2 * | 3/2012 | Wilson ................ A46B 5/0083 15/144.1 |
| 8,191,907 B2 | 6/2012 | Watson |
| 8,220,824 B2 | 7/2012 | Chen et al. |
| 8,286,739 B2 | 10/2012 | Oliphant |
| 8,297,642 B2 | 10/2012 | Tyson, III |
| 8,388,015 B2 | 3/2013 | Chen |
| 8,456,771 B2 | 6/2013 | Weber et al. |
| 8,458,829 B2 | 6/2013 | Thorne et al. |
| 8,490,732 B2 | 7/2013 | Sugimoto et al. |
| 8,556,740 B1 | 10/2013 | Schneider |
| 8,672,081 B2 | 3/2014 | Kume et al. |
| 8,746,377 B1 | 6/2014 | Dunbar |
| 8,746,710 B2 | 6/2014 | Schejbal |
| 8,851,503 B2 | 10/2014 | Tyson, III |
| 8,944,459 B1 | 2/2015 | Hagy |
| 8,955,855 B2 | 2/2015 | Herlitz et al. |
| D723,762 S | 3/2015 | Treadwell |
| 8,973,940 B2 | 3/2015 | Chen et al. |
| 9,033,361 B2 | 5/2015 | Frankel et al. |
| 9,045,152 B2 | 6/2015 | Sekine et al. |
| 9,056,621 B1 | 6/2015 | Jin et al. |
| 9,073,564 B2 | 7/2015 | Yang et al. |
| 9,108,656 B1 | 8/2015 | Nolan et al. |
| D738,436 S | 9/2015 | Cummings |
| 9,145,154 B1 | 9/2015 | Horowitz |
| 9,211,897 B2 | 12/2015 | Yang et al. |
| 9,242,663 B1 | 1/2016 | Nolan et al. |
| D748,739 S | 2/2016 | Horowitz |
| 9,327,749 B2 | 5/2016 | Young et al. |
| 9,365,225 B2 | 6/2016 | Henao |
| D763,532 S | 8/2016 | Huang |
| 9,580,095 B2 | 2/2017 | Vargas, II et al. |
| 9,738,298 B1 * | 8/2017 | Yang ...................... B62B 3/025 |
| 10,081,380 B2 | 9/2018 | Fitzwater et al. |
| 10,392,042 B2 * | 8/2019 | Fitzwater ............... B62B 3/007 |
| 10,464,586 B2 * | 11/2019 | Kalinowski ........... B62B 3/0625 |
| 10,737,604 B2 * | 8/2020 | Sellars .................. B60N 3/026 |
| 10,888,887 B2 * | 1/2021 | Masters ................. B05B 7/32 |
| 10,939,612 B2 * | 3/2021 | Lab ....................... A01D 34/90 |
| 11,097,761 B2 * | 8/2021 | Kim ..................... B62B 5/0043 |
| 2003/0025301 A1 | 2/2003 | Banuelos, III |
| 2003/0127835 A1 | 7/2003 | Shapiro |
| 2003/0227158 A1 | 12/2003 | Kassai et al. |
| 2004/0164512 A1 | 8/2004 | Gunter et al. |
| 2004/0238469 A1 | 12/2004 | Ng |
| 2005/0275195 A1 | 12/2005 | Matula et al. |

(56) References Cited

U.S. PATENT DOCUMENTS

| | | |
|---|---|---|
| 2006/0119056 A1 | 6/2006 | Olsen |
| 2007/0258435 A1 | 11/2007 | Saito et al. |
| 2007/0284900 A1 | 12/2007 | Sze |
| 2008/0041644 A1 | 2/2008 | Tudek et al. |
| 2008/0073880 A1 | 3/2008 | Bess |
| 2008/0217886 A1 | 9/2008 | Poppinga et al. |
| 2008/0246238 A1* | 10/2008 | Wu .................. B62B 3/12 280/47.18 |
| 2009/0066114 A1 | 3/2009 | Molton |
| 2009/0160150 A1* | 6/2009 | Johnson ............ B62K 15/006 280/87.041 |
| 2009/0161150 A1 | 6/2009 | Yu et al. |
| 2010/0123294 A1 | 5/2010 | Ellington et al. |
| 2010/0140902 A1 | 6/2010 | Zehfuss |
| 2010/0156069 A1 | 6/2010 | Chen |
| 2010/0229315 A1* | 9/2010 | Rosenzweig ......... B25G 3/38 15/144.1 |
| 2011/0025005 A1 | 2/2011 | Howell |
| 2011/0204598 A1 | 8/2011 | Stevenson |
| 2011/0316247 A1* | 12/2011 | Johnson .............. B62K 3/002 280/87.05 |
| 2012/0098238 A1* | 4/2012 | Wang ................. B62K 3/002 280/639 |
| 2012/0211970 A1 | 8/2012 | Saito et al. |
| 2012/0235372 A1 | 9/2012 | Herlitz et al. |
| 2012/0274052 A1 | 11/2012 | Zhu |
| 2013/0179016 A1 | 7/2013 | Gale |
| 2013/0239322 A1 | 9/2013 | Thorne et al. |
| 2014/0001735 A1 | 1/2014 | Yang et al. |
| 2014/0196968 A1 | 7/2014 | Bieler et al. |
| 2014/0353945 A1 | 12/2014 | Young et al. |
| 2015/0035258 A1 | 2/2015 | Chen et al. |
| 2015/0053042 A1 | 2/2015 | Shirakawa et al. |
| 2015/0084298 A1 | 3/2015 | Herlitz et al. |
| 2015/0145224 A1* | 5/2015 | Zhu .................. B62B 3/007 280/42 |
| 2015/0151771 A1 | 6/2015 | Jin et al. |
| 2016/0347338 A1 | 12/2016 | Vargas, II et al. |
| 2018/0057035 A1* | 3/2018 | Choi .................. B62B 9/26 |
| 2018/0208227 A1 | 7/2018 | Young et al. |
| 2019/0023299 A1 | 1/2019 | Simmons et al. |
| 2019/0185038 A1* | 6/2019 | Choi ................ B60B 33/02 |
| 2021/0061332 A1* | 3/2021 | Sturgeon ............. B62B 3/007 |
| 2021/0107551 A1* | 4/2021 | Sturgeon ............. B62B 5/082 |
| 2021/0403064 A1* | 12/2021 | Wang ................ B62B 3/007 |
| 2022/0063362 A1* | 3/2022 | MacDonald .......... B62B 5/0033 |
| 2022/0297736 A1* | 9/2022 | Hu .................. B62B 3/02 |
| 2022/0306179 A1* | 9/2022 | Wernberg ............ B62B 1/24 |

FOREIGN PATENT DOCUMENTS

| | | |
|---|---|---|
| GB | 190407310 A | 8/1904 |
| JP | 2001-1706 | 1/2001 |
| JP | 2009-137521 | 6/2009 |
| JP | 2010-184696 | 8/2010 |

OTHER PUBLICATIONS

International Preliminary Report on Patentability issued to PCT/US20/56827, dated May 5, 2022 (9 pages).

International Search Report and Written Opinion issued to PCT/US20/56827, dated Jan. 21, 2021 (16 pages).

International Search Report and Written Opinion issued to PCT/US20/24924, dated Jan. 11, 2021 (17 pages).

International Search Report and Written Opinion issued to PCT/US20/48493, dated Nov. 20, 2020 (12 pages).

International Search Report and Written Opinion issued to PCT/US20/056827, dated Jan. 21, 2021 (16 pages).

* cited by examiner

HANDLE RELEASE AND LOCKING MECHANISM

CROSS-REFERENCE TO RELATED APPLICATIONS

This application claims the benefit of U.S. Provisional Patent Application No. 62/925,010 filed Oct. 23, 2019, which is expressly incorporated herein by reference and made a part hereof.

FEDERALLY SPONSORED RESEARCH OR DEVELOPMENT

Not Applicable.

TECHNICAL FIELD

The present disclosure relates generally to a release and locking mechanism, and more specifically to a release and locking mechanism for a handle for a wagon.

BACKGROUND

Wagons and handles for wagons are well known in the art. While such wagon handles according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a release and locking mechanism for a handle for a wagon.

The disclosed technology further relates to a handle release and locking mechanism for a wagon, comprising: a bracket having opposing extensions and a linear slot therethrough, the bracket connecting the handle release and locking mechanism to the wagon; a pivotable drum between the opposing extensions, the drum having a track; a handle secured to the drum; a release pedal adjacent the drum, the release pedal having an arcuate slot, the release pedal moving from a locked position to an unlocked position; a main shaft about which the drum pivots; and, a locking pin extending through the arcuate slot in the release pedal, the linear slot in the extensions, and the track in the drum, the locking pin moving from a first position to a second position, wherein the handle is locked in a generally vertical position when the locking pin is in the first position, and wherein the handle and pivotable drum can pivot about the main shaft when the locking pin is in the second position.

The disclosed technology further relates to a handle release and locking mechanism for a wagon, comprising: a bracket with a pair of opposing extensions; a pivotable drum between the opposing extensions; a handle secured to the drum; a release pedal adjacent the drum, the release pedal moving from a locked position to an unlocked position; a main shaft about which the drum and the release pedal pivot; and, a locking pin extending through the release pedal, the extensions, and the drum, the locking pin moving from a first position to a second position, wherein the handle is locked in a generally vertical position when the locking pin is in the first position, and wherein the handle and pivotable drum can pivot about the main shaft when the locking pin is in the second position.

The disclosed technology further relates to a handle release and locking mechanism for a wagon, comprising: a pivotable drum; a handle secured to the drum; a release pedal adjacent the drum, the release pedal moving from a locked position to an unlocked position; a main shaft about which the drum pivots; and, a locking pin extending through the release pedal and the drum, the locking pin moving from a first position to a second position, wherein the handle is locked in a generally vertical position when the locking pin is in the first position, and wherein the handle and pivotable drum can pivot about the main shaft when the locking pin is in the second position.

The disclosed technology further relates to a handle release and locking mechanism further comprising an end plate adjacent the drum, the end plate having a track that mates with the track in the drum.

The disclosed technology further relates to a handle release and locking mechanism, wherein the release pedal pivots about the main shaft from locked position to the unlocked position.

The disclosed technology further relates to a handle release and locking mechanism, wherein when the release pedal pivots from the locked position to the unlocked position, the locking pin is moved from its first position to its second position.

The disclosed technology further relates to a handle release and locking mechanism, wherein the release pedal also pivots from the unlocked position to the locked position to move the locking pin from its second position to its first position.

The disclosed technology further relates to a handle release and locking mechanism, wherein the drum and handle are prevented from rotating from the generally vertical position when the locking pin is in the first position.

The disclosed technology further relates to a handle release and locking mechanism, further comprising a bias member to bias the release pedal to the locked position and the locking pin to the first position.

The disclosed technology further relates to a handle release and locking mechanism, wherein the track of the drum in cooperation with the locking pin limits a range of pivoting movement of the drum about the main shaft.

The disclosed technology further relates to a handle release and locking mechanism, wherein the bracket is connected to the wagon.

The disclosed technology further relates to a handle release and locking mechanism, wherein the opposing extensions each have a linear slot therethrough, wherein the pivotable drum has a track, and wherein the release pedal has an arcuate slot, the locking pin extending through the arcuate slot in the release pedal, the linear slot in the extensions, and the track in the drum.

The disclosed technology further relates to a handle release and locking mechanism, wherein the linear slot in the opposing extensions provides a path for the locking pin to move from the first position to the second position.

The disclosed technology further relates to a handle release and locking mechanism, wherein the release pedal has a slot that operates as a cam to move the locking pin from the first position to the second position, and from the second position to the first position.

The disclosed technology further relates to a handle release and locking mechanism, wherein the track of the pivotable drum comprises a linear portion and an arcuate portion connected to the linear portion.

The disclosed technology further relates to a handle release and locking mechanism, wherein the release pedal comprises a central pedal portion with opposing ears.

The disclosed technology further relates to a handle release and locking mechanism, further comprising a bracket with a pair of opposing extensions, wherein the pivotable drum is provided between the opposing extensions, and wherein the extensions have a linear slot that provides a path for the locking pin to move from the first position to the second position.

The disclosed technology further relates to a handle release and locking mechanism, wherein the release pedal pivots about the main shaft from locked position to the unlocked position to cause the locking pin to move from the first position to the second position.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings.

DETAILED DESCRIPTION

Figure 1:
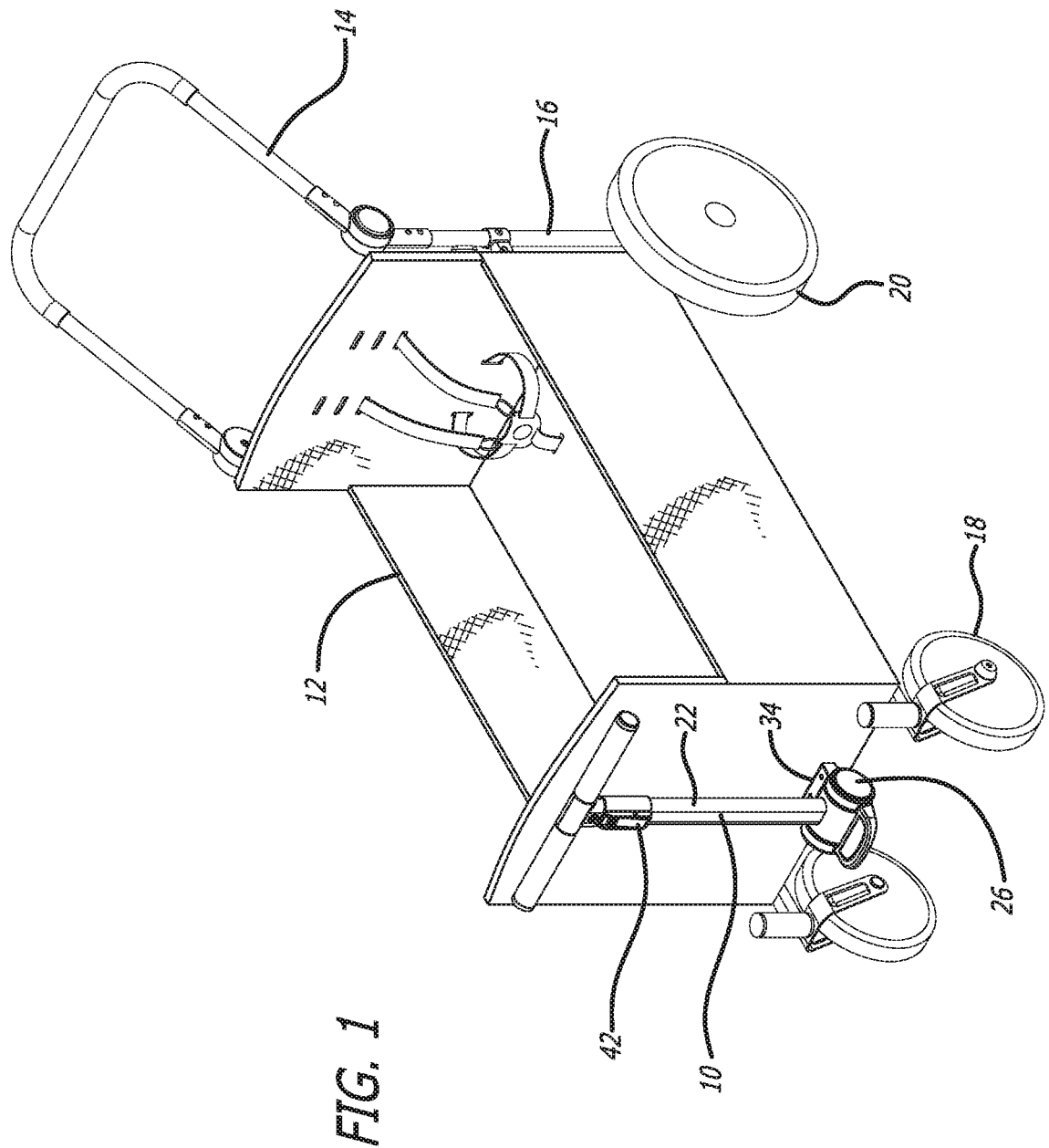
FIG. 1 is a front perspective view of a wagon having a handle release and locking mechanism according to the present disclosure.

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Figure 2:
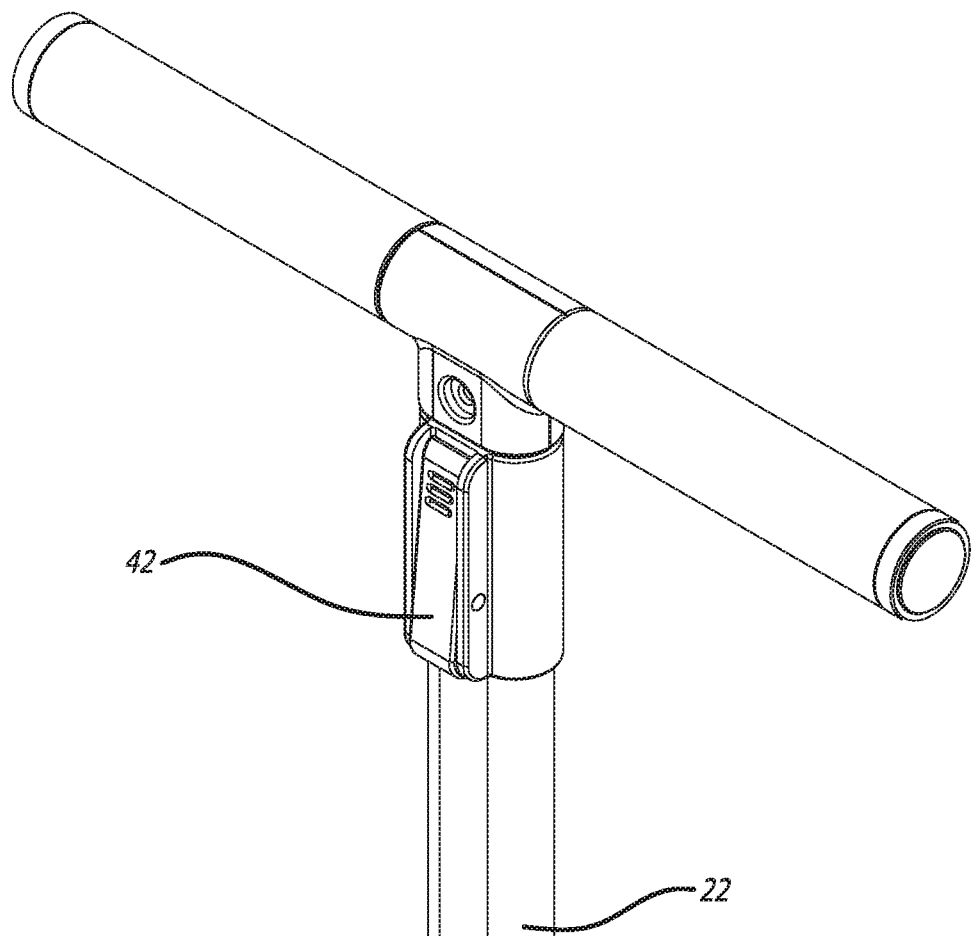
FIG. 2 is a front perspective view of the handle release and locking mechanism removed from the wagon of FIG. 1 according to the present disclosure.
Figure 2:
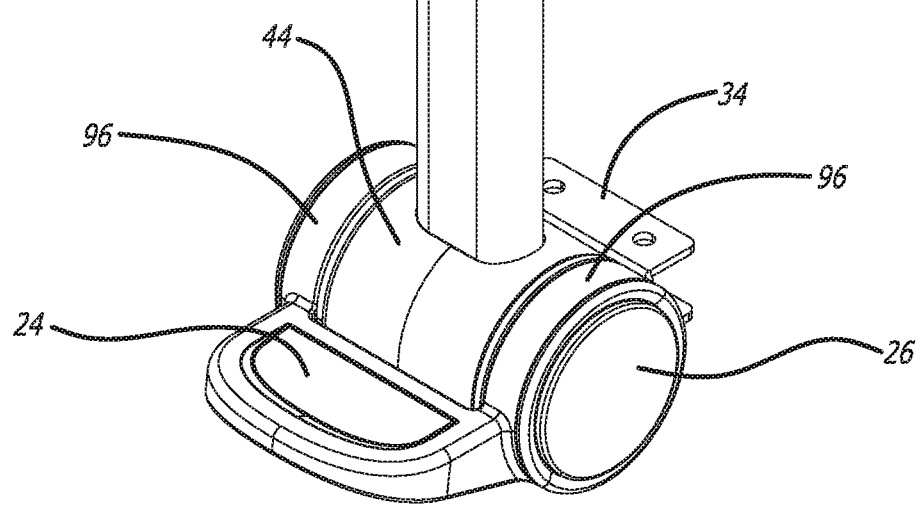
Figure 3:
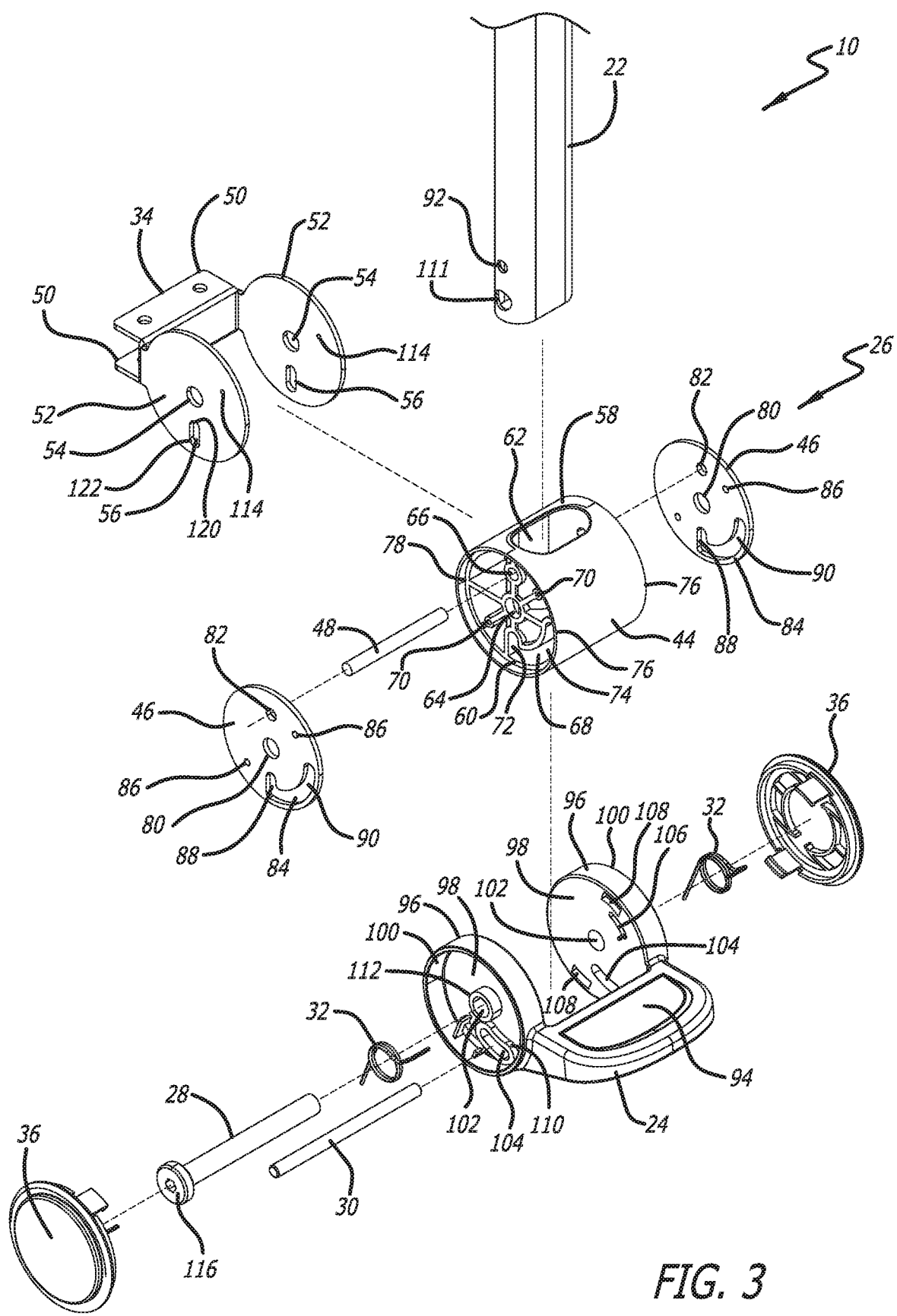
FIG. 3 is a partial perspective exploded view of the handle release and locking mechanism of FIG. 2 according to the present disclosure.

Referring now to the figures, and initially to FIGS. 1-3, there is shown a handle release and locking mechanism 10 for a wagon 12 according to one embodiment. In various embodiments, the wagon 12 may be a foldable wagon 12 that includes a foldable push bar 14 and a frame assembly 16 that is moveable between an unfolded or use configuration and a collapsed or folded configuration. Alternately, however, the wagon may be a standard wagon, such as a wooden wagon or plastic wagon. Additionally, the frame assembly 16 need not be collapsible or foldable. And, the push bar 14 is not required. In various embodiments, the wagon 12 includes two front wheels 18 and two rear wheels 20.

Figure 4:
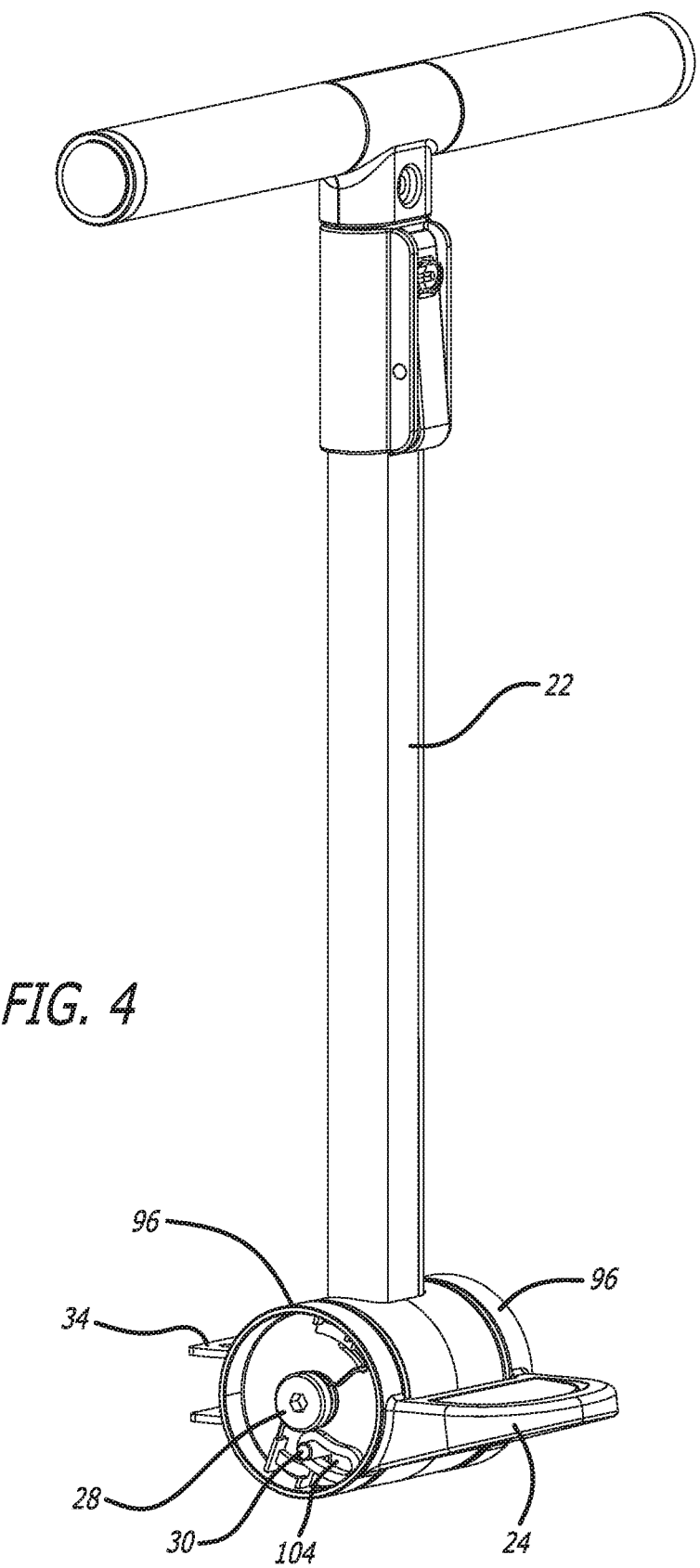
FIG. 4 is a perspective view the handle release and locking mechanism of FIG. 2, with the end caps removed, according to the present disclosure.
Figure 5:
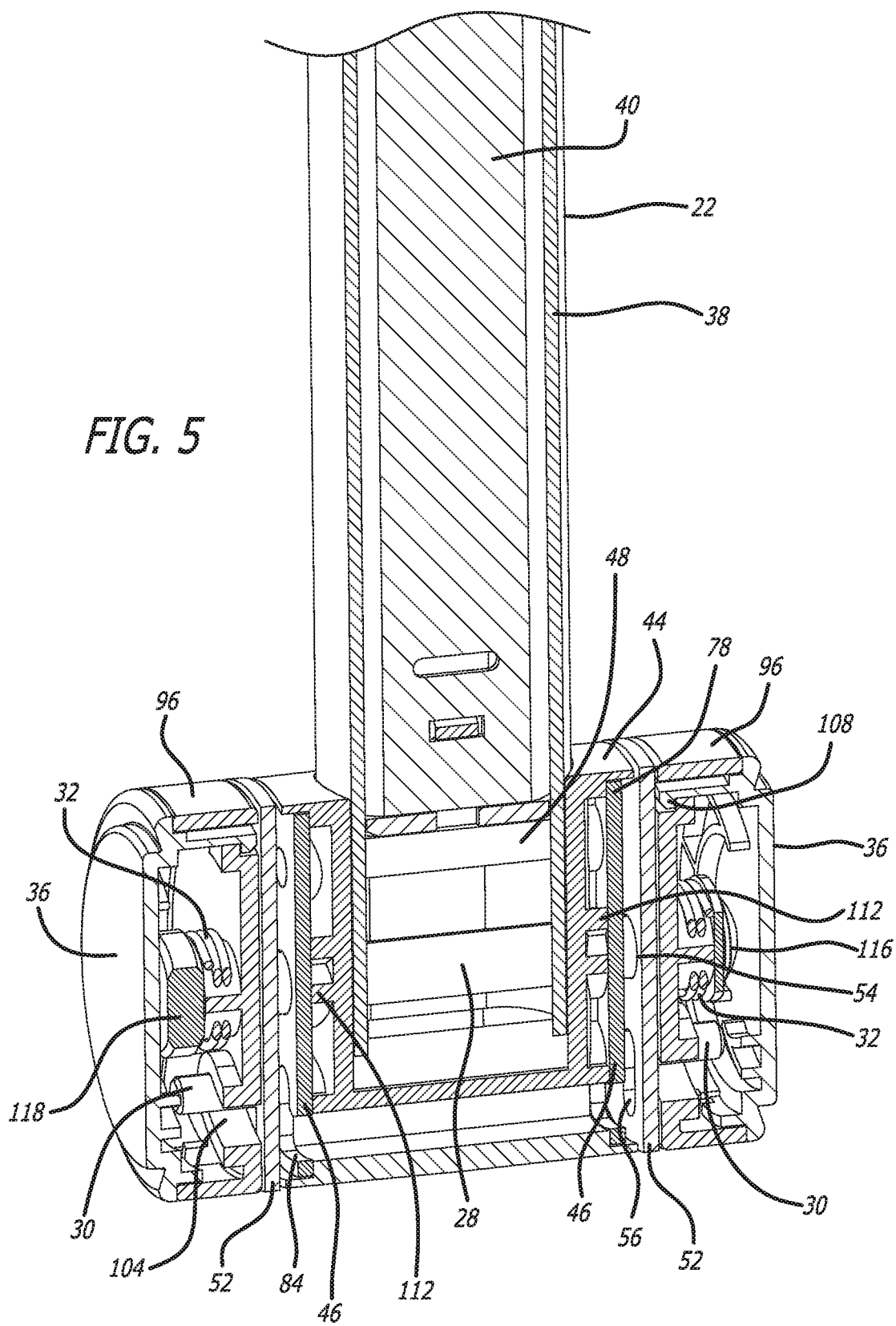
FIG. 5 is a front cross-sectional view of the handle release and locking mechanism of FIG. 2 according to the present disclosure.

In various implementations, as best shown in FIG. 3, the handle release and locking mechanism 10 comprises a handle 22, a release pedal 24, a knuckle assembly 26, a shaft 28, a locking pin 30, a bias member 32, a bracket 34, and end caps 36. In one embodiment, the handle 22 is secured to the drum 44 and may comprise a telescoping handle 22 as shown in FIGS. 4 and 5. The telescoping handle 22 may comprise a fixed handle member 38, a telescoping handle member 40 and a latch 42 to release the telescoping handle member 40 to allow for expansion of the handle 22 in an expanded position (not shown) and retraction of the telescoping handle member 40 back to the retracted position, and to fix the telescoping handle member 40 in both the expanded position and the retracted position (shown in FIG. 4). Additionally, in one embodiment, the knuckle assembly 26 may comprise a drum 44, a pair of end plates 46, and a support member 48.

Figure 6:
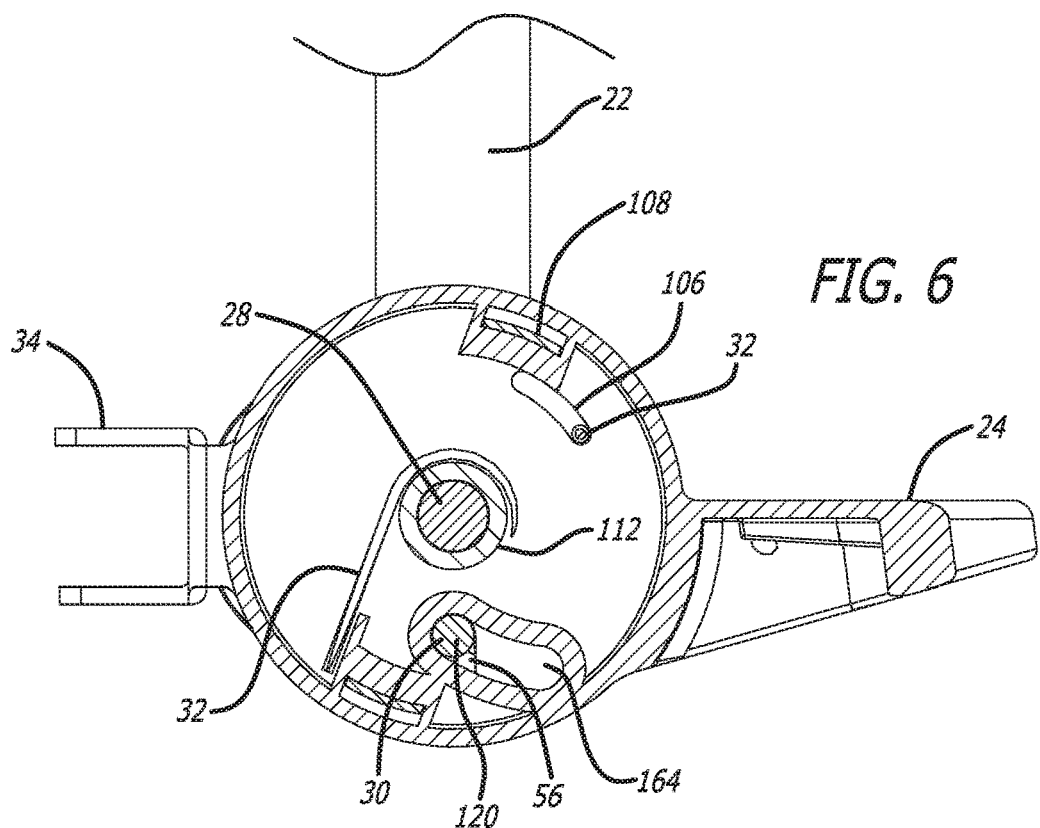
FIG. 6 is a side cross-sectional view through the release member of the handle release and locking mechanism of FIG. 2 according to the present disclosure, with the handle in the locked position.
Figure 7:
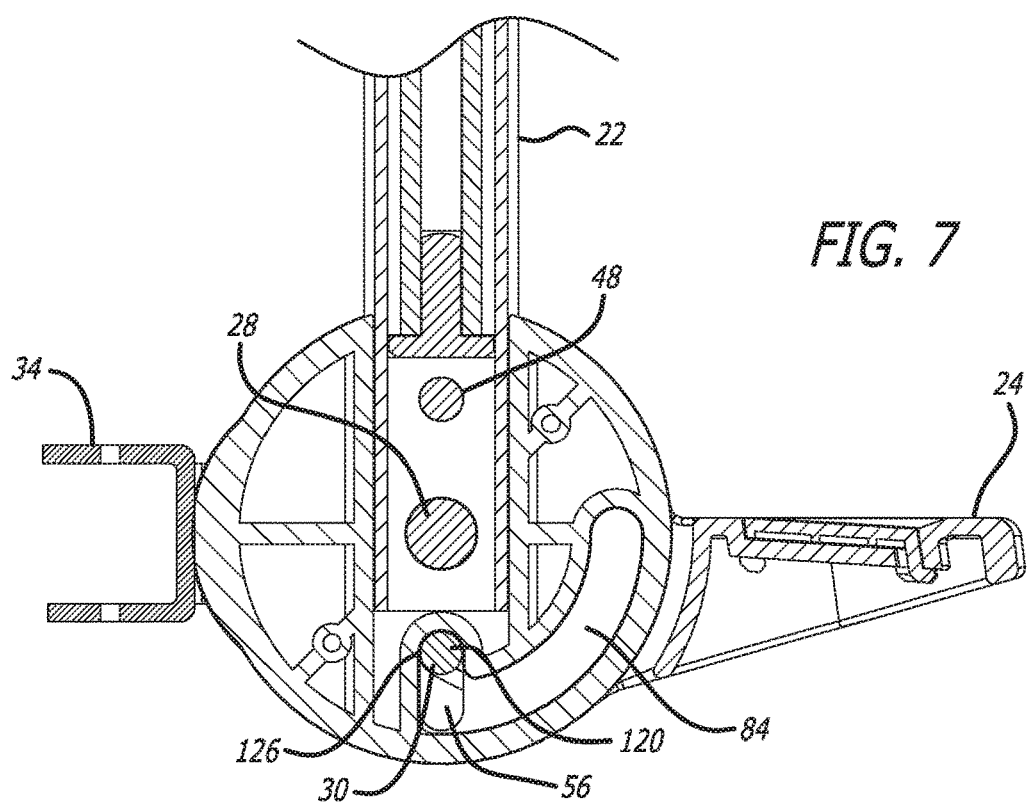
FIG. 7 is a side cross-sectional view through the side plate of the handle release and locking mechanism of FIG. 2 according to the present disclosure, with the handle in the locked position.
Figure 8:
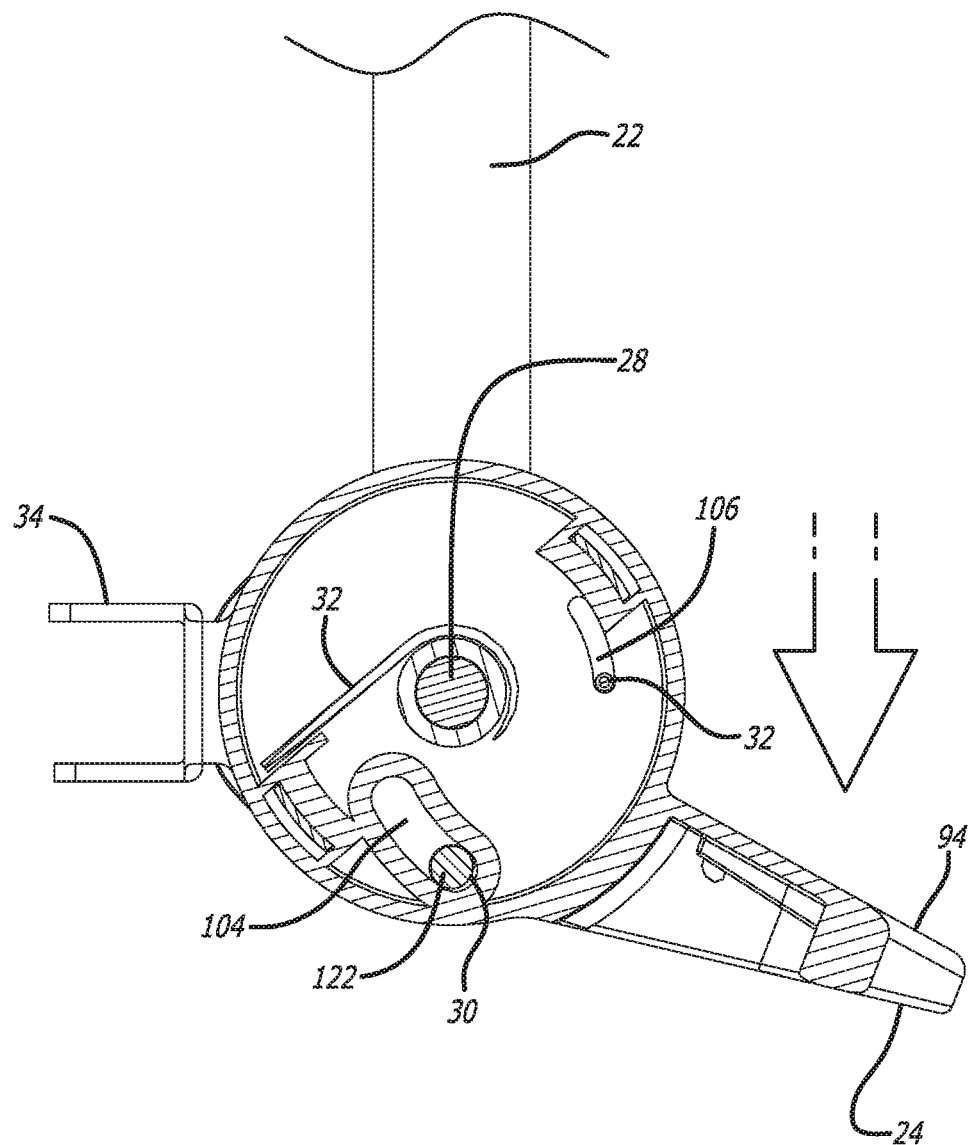
FIG. 8 is a side cross-sectional view through the release member of the handle release and locking mechanism of FIG. 2 according to the present disclosure, with the handle in the unlocked position.
Figure 9:
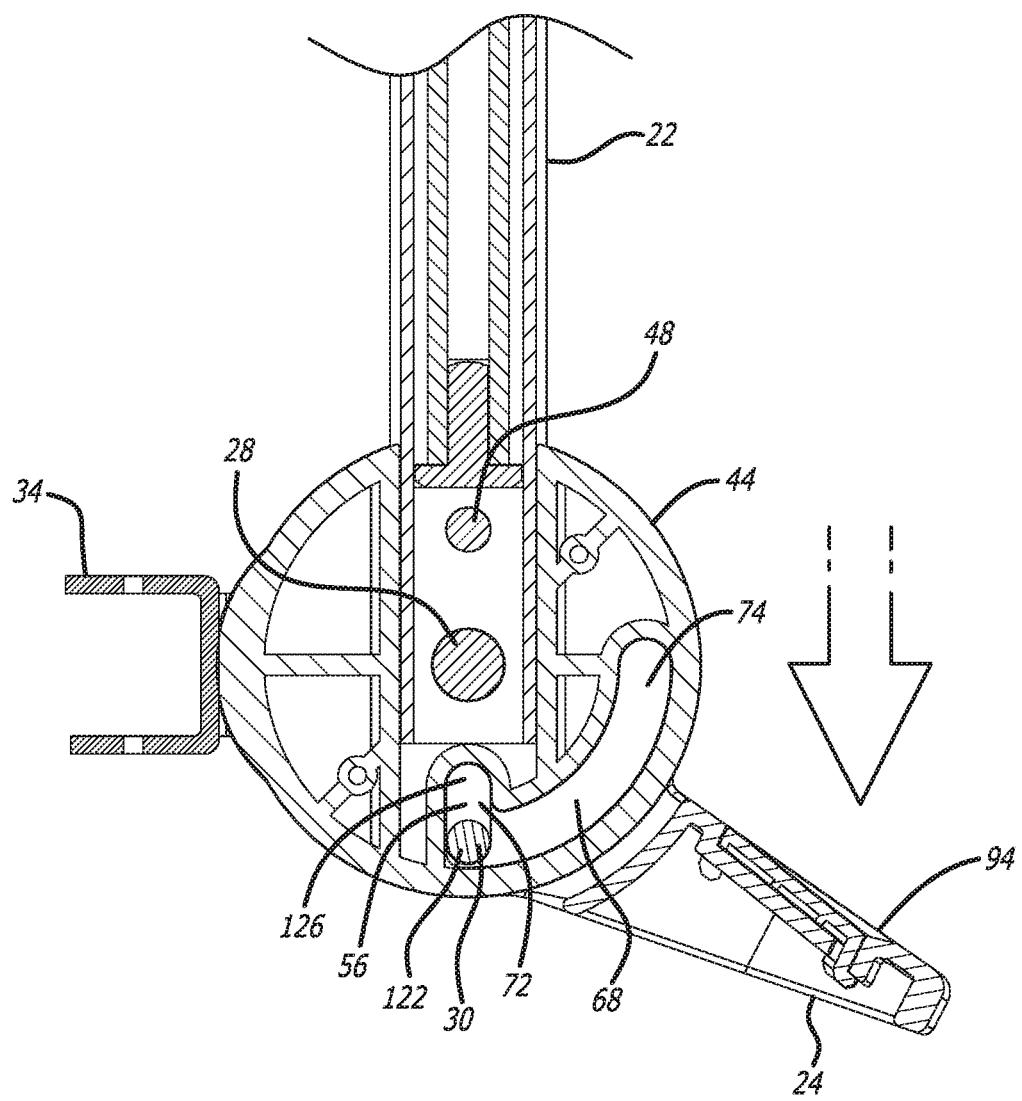
FIG. 9 is a side cross-sectional view through the side plate of the handle release and locking mechanism of FIG. 2 according to the present disclosure, with the handle in the unlocked position.
Figure 10:
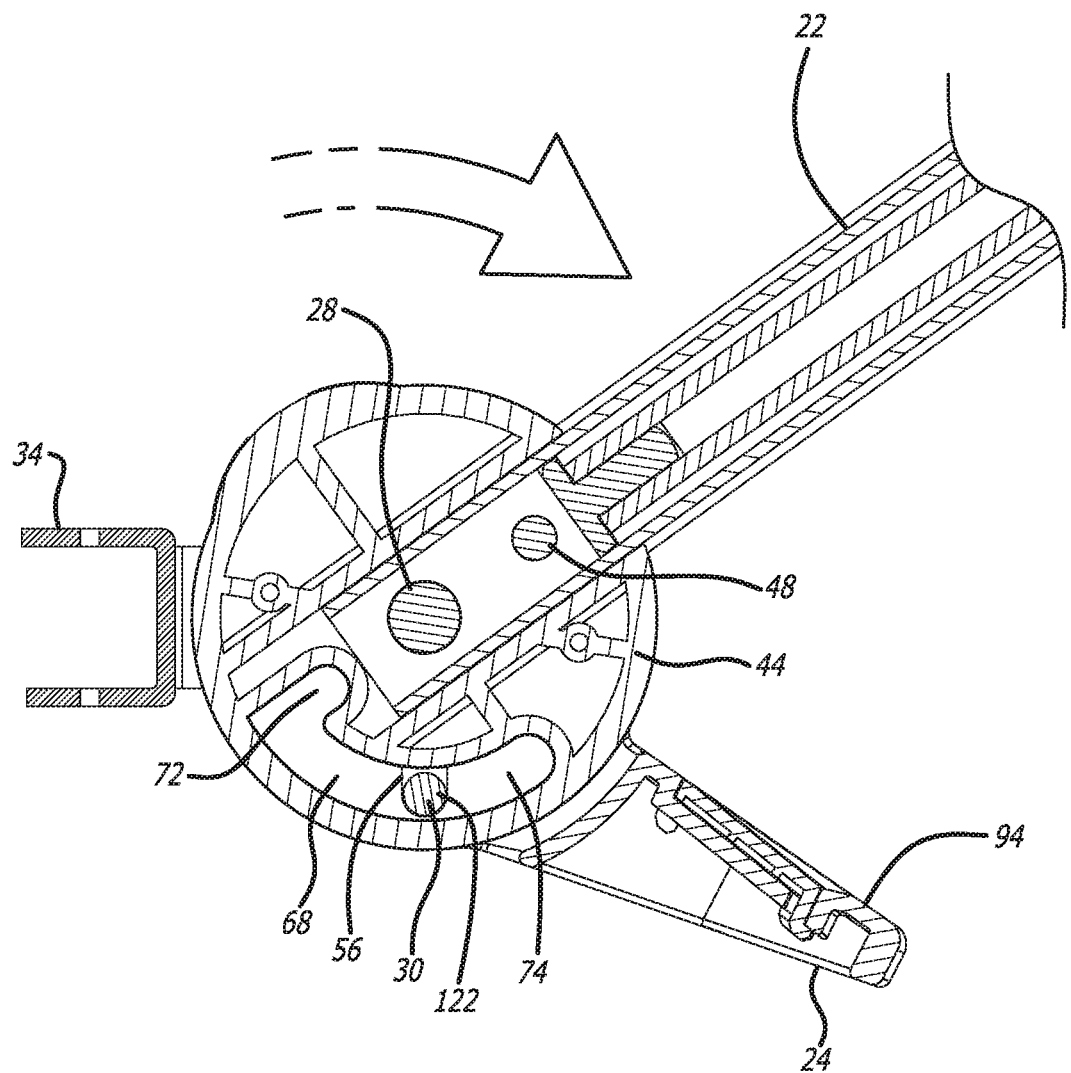
FIG. 10 is a side cross-sectional view through the side plate of the handle release and locking mechanism of FIG. 2 according to the present disclosure, with the handle in the unlocked position and the handle pivoted from the vertical position.

In operation, the release pedal 24 is provided adjacent the drum 44 and has a locked position (FIGS. 4-7) and an unlocked position (FIGS. 8-10) which it can move between. In the locked position of the release pedal 24, the locking pin 30 is positioned in a first position as shown in FIGS. 6 and 7 that prevents the drum 44 and handle 22 from rotating from the locked vertical position as shown in FIG. 1. However, when the release pedal 24 is transitioned to the unlocked position, the locking pin 30 is moved to a second position as shown in FIGS. 8-10, whereby the drum 44 and handle 22 are allowed to pivot from the locked vertical position to an angular position such as shown in FIG. 10. When the handle 22 and drum 44 are pivoted back to the vertical position the bias member 32 will force the release pedal 24 back to its locked position and the locking pin 30 back to its first position, thereby again preventing the drum 44 and handle 22 from rotating from the locked vertical position as shown in FIG. 1.

Referring to FIGS. 1-3, in one embodiment the handle release and locking mechanism 10 is connected to the wagon 12 via bracket 34. In one embodiment the bracket 34 has a pair of flanges 50 to secure the bracket 34 to the wagon 12, such as the wagon frame assembly 16 in the embodiment illustrated, with the use of fasteners (not shown). The bracket 34 also has opposing extensions 52 to rotatably secure the knuckle assembly 26, release pedal 24 and handle 22 thereto via the main shaft 28 as explained herein. In one embodiment, the extensions 52 of the bracket 34 have a circular shape, similar to the cross-sectional shape of the drum 44 of the knuckle assembly 26. Preferably, the bracket 34 is made of a metal, such as aluminum or steel. The extensions 52 have a central aperture 54 for receiving the main shaft 28, as well as a linear slot 56 therethrough. The linear slot 56 is preferably vertical and provides a path for the locking pin 30 as explained herein to move from the first position to the second position.

As discussed above, in one embodiment the knuckle assembly 26 generally comprises the pivotable drum 44, end plates 46 and support member 48. In various embodiments, the drum 44 pivots about the main shaft 28 (see FIGS. 3-6) between the opposing extensions 52 of the bracket 34 as shown in FIG. 5. In one embodiment, the drum 44 has a cylindrical outer housing 58, opposing end walls 60, and a receiver 62 for the handle 22. In one embodiment, the end walls 60 of the drum 44 are the ends of the respective components therein. The receiver 62 is preferably shaped similar to the periphery of the handle 22.

Referring to FIGS. 3, 7, 9 and 10, in one embodiment the opposing end walls 60 of the drum 44 of the knuckle assembly 26 have central aperture 64 for the main shaft 28, a second aperture 66 for the support member 48, and a track 68 for the locking pin 30. Additionally, opposing end walls 60 of the drum 44 may have receivers 70 for receiving fasteners (not shown) to secure the end plates 46 to the end walls 60 of the drum 44. In one embodiment, the track 68 comprises a linear portion 72 and an arcuate portion 74 connected to the linear portion 72. Further, in one embodiment, the end walls 60 of the drum 44 may have raised surfaces around the various openings, such as around the central aperture 64, second aperture 66 and track 68 for structural integrity and spacing purposes, however, the raised surfaces are not critical. In one embodiment the drum 44 is made of a polymer, such as plastic, however alternate materials may be used to construct the drum 44. The end walls 60 are preferably recessed from the end edges 76 of the cylindrical outer housing 58 of the drum 44. And, there may be a shoulder 78 provided on the interior surface of the wall of the outer housing 58 of the drum 44.

As best shown in FIGS. 3 and 5, in one embodiment the end plates 46 are provided adjacent the opposing end walls 60 of the drum 44. Further, in one embodiment, the end plates 46 generally mirror various aspects of the end walls 60. For example, like the end walls 60 of the drum 44, the end plates 46 have a central aperture 80 for the main shaft 28, a second aperture 82 for the support member 48, and a track 84 for the locking pin 30. Additionally, the end plates 46 preferably have openings 86 that mate with the receivers 70 of the ends walls 60 of the drum 44 for having fasteners (not shown) secure the end plates 46 to the end walls 60 of the drum 44. In one embodiment, the track 84 similarly comprises a linear portion 88 and an arcuate portion 90 connected to the linear portion 88. The track of the end plate generally mates with the track in the drum.

To assemble the knuckle assembly 26 the respective end plates 46 are fitted within the respective openings at the ends of the drum 44, and seated against the shoulder 78 therein. The end plates 46 are then secured to the end walls 60 with fasteners (not shown) extending through the openings 86 in the end plates 46 that mate with the receivers 70 of the ends walls 60 of the drum 44. Next, the handle 22 may be inserted into the receiver 62 of the drum 44. The support member 48 may be inserted through the second aperture 82 in one of the end plates 46, then through the second aperture 66 in one of the end walls 60, then through a corresponding aperture 92 in the handle 22 (shown in FIG. 3), then through the second aperture 66 in the other end wall 60 and finally through the second aperture 82 in the second end plate 46. The support member 48 helps to retain the handle 22 in the receiver 62 of the drum 44 and provides additional rigidity to the overall knuckle assembly 26.

As shown in FIGS. 3-6 and 8, in one embodiment, the release pedal 24 comprises a central pedal portion 94 with opposing ears 96. In one embodiment, each of the ears 96 have an end wall 98 and a generally cylindrical sidewall 100. Referring to FIGS. 3, 6 and 8, in one embodiment each end wall 98 of the release pedal 24 preferably has a central aperture 102 for the main shaft 28 and a cam track 104 for the locking pin 30. Additionally, each end wall 98 may have an opening 106, such as an arcuate slot 106, for providing through access for a portion of the bias member 32. The opposing ears 96 also preferably have a receiver 108 for securing an end cap 36 thereto. In one embodiment, the cam track 104 comprises an arcuate slot 104. Further, in one embodiment, a rib 110 or raised wall 110 is provided around the cam track 104. Additionally, a rib 112 or raised wall 112 is also provided around each central aperture 102 for seating a portion of each respective bias member 32. In one embodiment the release pedal 24 is made of a polymer, such as plastic, however alternate materials may be used to construct the release pedal 24. The release pedal 24 pivots about the main shaft 28 from the locked position to the unlocked position.

To assemble the handle release and locking mechanism 10, the assembled knuckle assembly 26 with the handle 22 connected thereto, as explained above, is fitted between the two opposing extensions 52 of the bracket 34. The central apertures 54 of the bracket extensions 52 on each end are aligned with the central apertures 80 of the respective end plates 46 of the knuckle assembly 26. Further, the vertical slot 56 of each extension 52 of the bracket 34 is aligned with the linear portion 88 of the respective tracks 84 in the respective end plates 46 of the knuckle assembly 26.

Next, the release pedal 24 is fitted on the outside of the two opposing extensions 52 of the bracket 34 while the knuckle assembly 26 is positioned as explained above on the inside or between the two opposing extensions 52 of the bracket 34. The central aperture 102 in each ear 96 of the release pedal 24 is aligned with the respective central apertures 54 of the bracket extensions 52 and central apertures 80 of the end plates 46 of the knuckle assembly 26. Additionally, separate bias members 32 are seated on the outside of the raised walls 112 of the respective ears 96 of the release pedal 24, and a portion of the bias members 32 are positioned through the respective openings 106 in the ears 96 and seated within apertures 114 in each extension 52, respectively, of the bracket 34.

The next assembly step is to insert the main shaft 28 to pivotably fix the knuckle assembly 26 and release pedal 24 to the bracket 34. The main shaft 28, which may comprise a bolt, such as a shoulder bolt, is fitted into each of the respective central apertures (central aperture 102 of the first ear 96, central aperture 54 of the first extension 52 of the bracket 34, central aperture 80 of the first end plate 46, both central apertures 64 of the drum 44, central aperture 80 of the second end plate, central aperture 54 of the second extension 52 of the bracket 34, and central aperture 102 of the second ear 96). The main shaft 28 also extends through the aperture 111 in the handle 22. In one embodiment the bolt head 116 of the main shaft 28 retains one of the bias members 32 around the raised wall 112 of one ear 96 (see FIGS. 3 and 5), and the nut 118 connected to the opposing end of the main shaft 28 retains the other of the bias members 32 around the raised wall 112 of the opposing ear 96.

After the release pedal 24, knuckle assembly 26, bias members 32 and bracket 34 are connected together with the main shaft 28, the locking pin 30 may be inserted. The locking pin 30 extends through the cam track 104 in each end wall 98 of the release pedal 24, through the vertical slot 56 of the extension 52 of the bracket 34, though the track 84 for the end plate 46, through the track 68 of the drum 44, and similarly through the opposing track 68 of the drum 44, track 84 of the end plate 46, vertical slot 56 of the bracket 34, and finally the cam track 104 in the opposing end wall 98 of the release pedal 24.

In use, in one embodiment, the locking pin 30 moves from a first position at the first end 120 or top of the vertical slot 56 of the extension 52 (as shown in FIGS. 6 and 7), to a second position at the second end 122 or bottom of the vertical slot 56 of the extensions (as shown in FIGS. 8 and 9). When the locking pin 30 is in the first position 120 of the vertical slot 56 it is also in the linear portion 88 of the track 84 of the end plates 46 (and similarly in the linear portion 72 of the track 68 of the drum 44). This position at the top 126 of the linear track is the locked position for the handle 22. In this position, the knuckle assembly 26 is locked in place and cannot pivot about the main shaft 28 and the handle 22 is locked in the generally vertical position.

To be able to pivot the knuckle assembly 26, including the drum 44 and handle 22, the locking pin 30 is moved from the first position 120 to the second position 122 by the cam track 104 of the release pedal 24. The bias members 32 operate to bias the release pedal 24 to the locked position shown in FIGS. 6 and 7 and the locking pin to the first position. When the user pushes on the pedal portion 94 of the release pedal 24 sufficient to overcome the force of the bias members 32, as shown in FIGS. 8 and 9, the release pedal 24 will pivot about the main shaft 28 from the locked position to the unlocked position. The cam track 104 of the release pedal 24 will move the locking pin 30 vertically downwardly in the vertical slot 56 from its first position shown in FIGS. 6 and 7 to its second position shown in FIGS. 8 and 9 as the release pedal 24 pivots from the locked position to the unlocked position.

When the locking pin 30 is moved from the first position 120 to its second position 122, it is simultaneously moved from the top locked position 126 in the linear portion 88 of the track 84 of the drum 44 to the arcuate portion 90 of the track 84 of the drum 44 as shown in FIG. 9. When the locking pin 30 is in the arcuate portion 90 of the track 84 of the drum 44 as shown in FIG. 10, the knuckle assembly 26 and drum 44 are free to pivot about the main shaft 28 to pivot the handle 22 from the vertical position to an angled or arcuate position making it easier for a user to pull the wagon 12. The track 84 of the drum 44 in cooperation with the locking pin 30 limits a range of pivoting movement of the drum 44 about the main shaft 18.

When the user pivots the handle 22 back to the vertical position the cam track 104 will move the locking pin 30 vertically upward in the vertical slot 56 from its second position to its first position thereby once again locking the handle 22 and knuckle assembly 26 in the locked vertical position. In an alternate embodiment, when the user releases the handle 22 in the angled or arcuate position, the bias member 32 is sufficiently strong to pivot the handle 22 toward the vertical to move the locking pin 30 via the cam track 104 and lock the knuckle assembly 26 and handle 22 in the locked position. When the knuckle assembly 26 and handle 26 are returned to the vertical position, the release pedal 94 will spring back to its normal or first position as shown in FIGS. 6 and 7. Additionally, the drum 44 and handle 26 are prevented from rotating from the generally vertical position when the locking pin 30 is in the first position.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A handle release and locking mechanism for a wagon, comprising:
    a bracket having opposing extensions and a linear slot therethrough, the bracket connecting the handle release and locking mechanism to the wagon;
    a pivotable drum between the opposing extensions, the drum having a track;
    a handle secured to the drum;
    a release pedal adjacent the drum, the release pedal having an arcuate slot, the release pedal moving from a locked position to an unlocked position independent of the bracket;
    a main shaft about which the drum pivots; and,
    a locking pin extending through the arcuate slot in the release pedal, the linear slot in the extensions, and the track in the drum, the locking pin moving from a first position to a second position, wherein the handle is locked in a generally vertical position when the locking pin is in the first position, and wherein the handle and pivotable drum can pivot about the main shaft when the locking pin is in the second position.

2. The handle release and locking mechanism of claim 1, further comprising an end plate adjacent the drum, the end plate having an endplate track that mates with the track in the drum.

3. The handle release and locking mechanism of claim 1, wherein the release pedal pivots about the main shaft from locked position to the unlocked position.

4. The handle release and locking mechanism of claim 3, wherein when the release pedal pivots from the locked position to the unlocked position, the locking pin is moved from its first position to its second position.

5. The handle release and locking mechanism of claim 3, wherein the release pedal also pivots from the unlocked position to the locked position to move the locking pin from its second position to its first position.

6. The handle release and locking mechanism of claim 1, wherein the drum and handle are prevented from rotating from the generally vertical position when the locking pin is in the first position.

7. The handle release and locking mechanism of claim 1, further comprising a bias member to bias the release pedal to the locked position and the locking pin to the first position.

8. The handle release and locking mechanism of claim 1, wherein the track of the drum in cooperation with the locking pin limits a range of pivoting movement of the drum about the main shaft.

9. A handle release and locking mechanism for a wagon, comprising:
- a bracket with a pair of opposing extensions;
- a pivotable drum between the opposing extensions;
- a handle secured to the drum;
- a release pedal adjacent the drum, the release pedal moving from a locked position to an unlocked position independent of the bracket;
- a main shaft about which the drum and the release pedal pivot; and,
- a locking pin extending through the release pedal, the extensions, and the drum, the locking pin moving from a first position to a second position, wherein the handle is locked in a generally vertical position when the locking pin is in the first position, and wherein the handle and pivotable drum can pivot about the main shaft when the locking pin is in the second position.

10. The handle release and locking mechanism of claim 9, wherein the bracket is connected to the wagon.

11. The handle release and locking mechanism of claim 9, wherein the opposing extensions each have a linear slot therethrough, wherein the pivotable drum has a track, and wherein the release pedal has an arcuate slot, the locking pin extending through the arcuate slot in the release pedal, the linear slot in the extensions, and the track in the drum.

12. The handle release and locking mechanism of claim 11, wherein the linear slot in the opposing extensions provides a path for the locking pin to move from the first position to the second position.

13. The handle release and locking mechanism of claim 9, wherein the release pedal has a slot that operates as a cam to move the locking pin from the first position to the second position, and from the second position to the first position.

14. The handle release and locking mechanism of claim 9, wherein the track of the pivotable drum comprises a linear portion and an arcuate portion connected to the linear portion.

15. The handle release and locking mechanism of claim 14, further comprising an end plate adjacent the drum, the end plate having an endplate track that mates with the track in the drum.

16. The handle release and locking mechanism of claim 9, wherein the release pedal comprises a central pedal portion with opposing ears.

17. A handle release and locking mechanism for a wagon, comprising:
- a pivotable drum, the drum having an outer housing between two opposing end walls;
- a handle secured to the drum, the drum having an opening in the outer housing into which the handle extends;
- a release pedal adjacent the drum, the release pedal moving from a locked position to an unlocked position;
- a main shaft about which the drum pivots; and,
- a locking pin extending through the release pedal and the drum, the locking pin moving from a first position to a second position, wherein the handle is locked in a generally vertical position when the locking pin is in the first position, and wherein the handle and pivotable drum can pivot about the main shaft when the locking pin is in the second position.

18. The handle release and locking mechanism of claim 17, further comprising a bracket with a pair of opposing extensions, wherein the pivotable drum is provided between the opposing extensions, and wherein the extensions have a linear slot that provides a path for the locking pin to move from the first position to the second position.

19. The handle release and locking mechanism of claim 17, wherein the release pedal pivots about the main shaft from locked position to the unlocked position to cause the locking pin to move from the first position to the second position.

20. The handle release and locking mechanism of claim 17, wherein the release pedal has a slot that operates as a cam to move the locking pin from the first position to the second position, and from the second position to the first position.

* * * * *